(12) United States Patent
Kannajosyula et al.

(10) Patent No.: US 11,408,863 B2
(45) Date of Patent: Aug. 9, 2022

(54) AUTOMATIC TRANSDUCER OPERATING FREQUENCY SELECTION

(71) Applicant: QI2 Elements, LLC, Kent, WA (US)

(72) Inventors: Haraprasad Kannajosyula, Seattle, WA (US); Phillip D. Bondurant, Covington, WA (US)

(73) Assignee: QUEST INTEGRATED, LLC, Kent, WA (US)

( * ) Notice: Subject to any disclaimer, the term of this patent is extended or adjusted under 35 U.S.C. 154(b) by 175 days.

(21) Appl. No.: 15/543,947

(22) PCT Filed: Jan. 13, 2016

(86) PCT No.: PCT/US2016/013285
§ 371 (c)(1),
(2) Date: Jul. 14, 2017

(87) PCT Pub. No.: WO2016/115270
PCT Pub. Date: Jul. 21, 2016

(65) Prior Publication Data
US 2018/0003680 A1   Jan. 4, 2018

Related U.S. Application Data

(60) Provisional application No. 62/103,315, filed on Jan. 14, 2015.

(51) Int. Cl.
*G01N 29/34* (2006.01)
*G01N 29/24* (2006.01)
(Continued)

(52) U.S. Cl.
CPC ....... *G01N 29/348* (2013.01); *G01N 29/2412* (2013.01); *G01N 29/262* (2013.01);
(Continued)

(58) Field of Classification Search
CPC .. G01N 29/348; G01N 29/2412; G01N 29/62; G01N 29/265; G01N 29/343;
(Continued)

(56) References Cited

U.S. PATENT DOCUMENTS

| 4,389,893 A | 6/1983 | Ophir et al. |
| 5,035,144 A | 7/1991 | Aussel |

(Continued)

FOREIGN PATENT DOCUMENTS

| CN | 103977949 A | 8/2014 |
| JP | 08271488 A | * 10/1996 |
| WO | 2010012809 A2 | 2/2010 |

OTHER PUBLICATIONS

International Search Report and Written Opinion dated Apr. 15, 2016, issued in corresponding International Application No. PCT/US2016/013285, filed Jan. 13, 2016, 9 pages.

(Continued)

*Primary Examiner* — Nimeshkumar D Patel
*Assistant Examiner* — Nashmiya S Fayyaz
(74) *Attorney, Agent, or Firm* — Christensen O'Connor Johnson Kindness PLLC

(57) ABSTRACT

Operating parameters are selected for inspecting a structure. Selecting the operating parameters includes exciting broadband ultrasonic guided waves in a multilayered structure, acquiring data corresponding to the sensed broadband ultrasonic guided waves in the multilayered structure, selecting one or more narrow frequency bands based on the acquired data, and inspecting the multilayered structure using ultrasonic guided waves in the one or more narrow frequency bands. In some examples, the data is acquired by an inspection tool capable of sensing the broadband ultrasonic guided waves in the multilayered structure.

9 Claims, 6 Drawing Sheets

(51) Int. Cl.
*G01N 29/26* (2006.01)
*G01N 29/42* (2006.01)
*G01N 29/46* (2006.01)
*G01N 29/265* (2006.01)

(52) U.S. Cl.
CPC ......... *G01N 29/265* (2013.01); *G01N 29/343* (2013.01); *G01N 29/42* (2013.01); *G01N 29/46* (2013.01); *G01N 29/346* (2013.01); *G01N 2291/0231* (2013.01); *G01N 2291/0425* (2013.01); *G01N 2291/102* (2013.01); *G01N 2291/2694* (2013.01)

(58) Field of Classification Search
CPC ...... G01N 29/42; G01N 29/46; G01N 29/346; G01N 2291/0231; G01N 2291/0425; G01N 2291/102; G01N 2291/2694; G01N 2291/2693; G01N 27/902; G01N 29/043; G01N 29/225; F03D 17/00; F03D 80/00; F03D 80/50; G01M 5/0016; G01M 5/0033; G01M 5/0075; Y02E 10/72
USPC ........................................ 73/579, 865.8, 643
See application file for complete search history.

(56) References Cited

U.S. PATENT DOCUMENTS

| 5,373,742 | A | | 12/1994 | Terhune |
| 5,635,619 | A | | 6/1997 | Udpa et al. |
| 5,661,241 | A | * | 8/1997 | Harth, III ............. G01B 17/025 |
| | | | | 702/171 |
| 5,824,908 | A | | 10/1998 | Schindel et al. |
| 5,947,886 | A | * | 9/1999 | Simmons ............. B31D 5/0047 |
| | | | | 493/403 |
| 6,250,159 | B1 | * | 6/2001 | Kreier .................... G01N 29/07 |
| | | | | 73/602 |
| 6,363,787 | B1 | | 4/2002 | Carlson et al. |
| H2112 | H | * | 12/2004 | Mignogna ...................... 73/579 |
| 7,600,442 | B2 | | 10/2009 | Hirose et al. |
| 7,963,165 | B2 | | 6/2011 | Sinha |

| 2006/0027021 | A1* | 2/2006 | Choi ...................... G01H 17/00 |
| | | | 73/579 |
| 2006/0126434 | A1* | 6/2006 | Intrator ............... G01S 7/52004 |
| | | | 367/135 |
| 2006/0140054 | A1* | 6/2006 | Intrator ................... G01S 7/527 |
| | | | 367/135 |
| 2007/0019506 | A1* | 1/2007 | Mandal .................. G01N 29/11 |
| | | | 367/117 |
| 2009/0250839 | A1* | 10/2009 | Andersen ............... B22D 25/02 |
| | | | 264/293 |
| 2012/0330569 | A1 | 12/2012 | Singh et al. |
| 2013/0008253 | A1 | 1/2013 | Tsuda |
| 2013/0338485 | A1* | 12/2013 | Mougenot .............. A61B 8/406 |
| | | | 600/411 |
| 2014/0174561 | A1 | 6/2014 | Hagihara et al. |
| 2016/0265349 | A1* | 9/2016 | Saulnier .................. E21B 47/16 |
| 2016/0320219 | A1* | 11/2016 | Hellevang ............... G01F 1/662 |
| 2018/0003679 | A1* | 1/2018 | Prinzhorn ............... G01N 29/04 |
| 2019/0072951 | A1* | 3/2019 | Clark ..................... B64D 47/02 |

OTHER PUBLICATIONS

Supplementary European Search Report, dated Jul. 20, 2018, issued in corresponding U.S Application No. 16737832.2, filed Jan. 13, 2016, 9 Pages.
First Office Action, dated Jun. 26, 2019, issued in corresponding Chinese Patent Application No. 201680014975.7, filed Jan. 13, 2016, 12 pages.
Second Office Action, dated Apr. 16, 2020, issued in corresponding Chinese Patent Application No. 201680014975.7, filed Jan. 13, 2016, 23 pages.
Third Office Action, dated Oct. 10, 2020, issued in corresponding Chinese Patent Application No. 201680014975.7, filed Jan. 13, 2016, 8 pages.
Communication pursuant to Article 94(3) EPC, dated May 27, 2021, issued in corresponding European Application No. 16737832.2, filed Jan. 13, 2016, 5 pages.
Second Canadian Office Action, dated Nov. 8, 2021, issued in corresponding Canadian Application No. 2,972,274, filed Jun. 23, 2017, 3 pages.
Examiner's Report, dated May 20, 2021, issued in corresponding Canadian Application No. 2,972,274, filed Jan. 13, 2016, 6 pages.

* cited by examiner

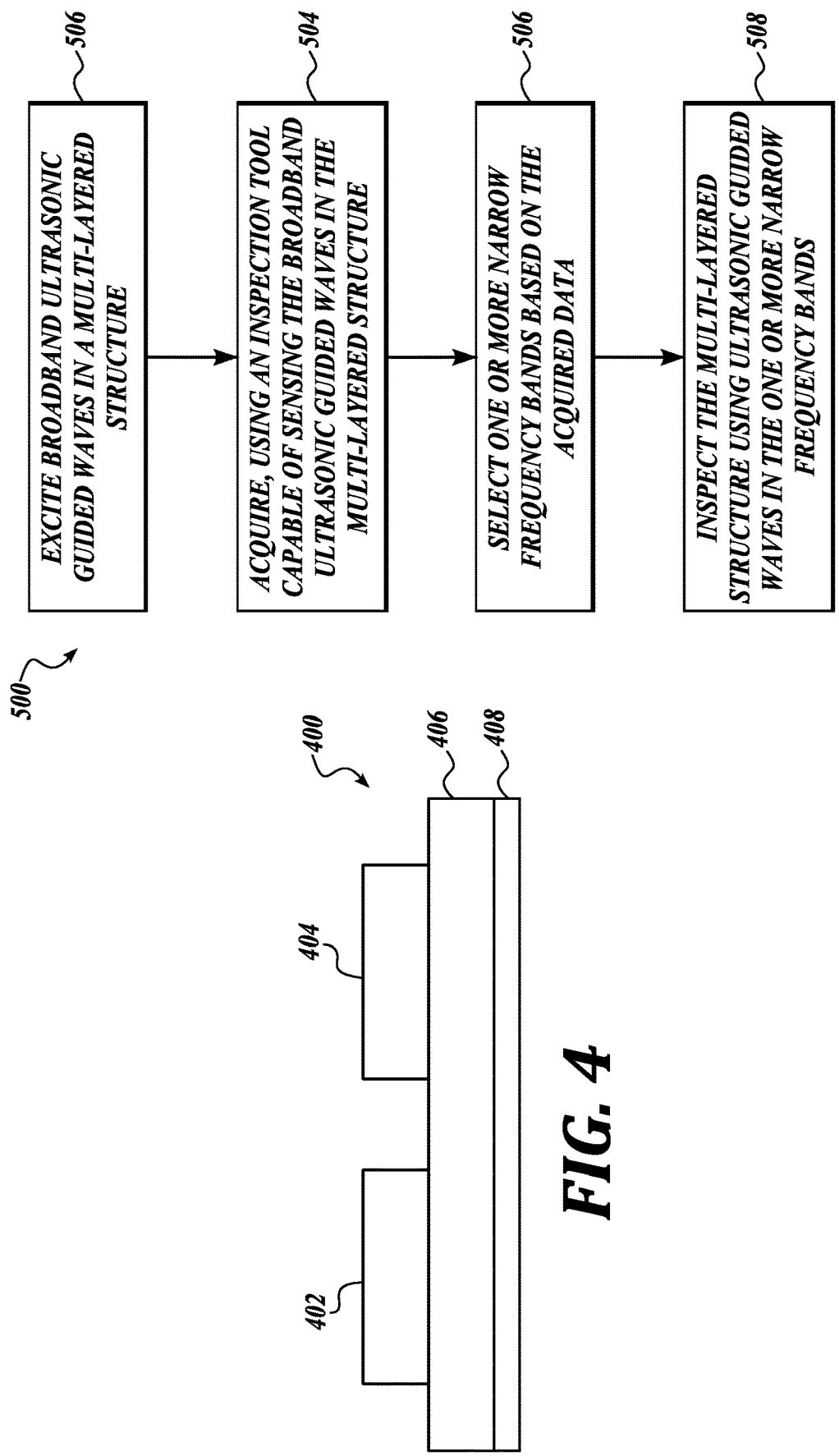

AUTOMATIC TRANSDUCER OPERATING FREQUENCY SELECTION

CROSS-REFERENCE(S) TO RELATED APPLICATION(S)

This application claims the benefit of U.S. Provisional Application No. 62/103,315, filed Jan. 14, 2015, the contents of which are incorporated herein by reference in their entirety.

BACKGROUND

Devices using ultrasonic guided waves (USGW) have been increasing in importance as a means for inspecting structures, such as plates, pipes and shells that may be comprised of multiple layers of distinct materials. Every USGW inspection system design involves selection of operating points that include a collection of parameters, such as sensor geometry, frequency, wavelength, time delays and amplitude depending on sensor configuration (wedge or array based), the structure being inspected and the region of the structure being inspected. Guided waves offer an infinite number of choices for such operating points and the decision-making process can require extensive modeling and development activity. Performance-critical structures in particular require optimal selection of the operating points as they have a limited margin of error.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method of selecting operating parameters for inspecting a structure includes exciting broadband ultrasonic guided waves in a multilayered structure, acquiring, by an inspection tool capable of sensing the broadband ultrasonic guided waves in the multilayered structure, data corresponding to the sensed broadband ultrasonic guided waves in the multilayered structure, selecting one or more narrow frequency bands based on the acquired data, and inspecting the multilayered structure using ultrasonic guided waves in the one or more narrow frequency bands.

In one example, the multilayered structure includes a coated metallic pipe having one or more of a varying wall thickness, a varying coating thickness, or a varying quality. In another example, the inspection tool is an electromagnetic acoustic transducer based inline inspection tool. In another example, the one or more narrow frequency bands comprise a long pulse width with a plurality of cycles. In another example, the ultrasonic guided waves in the one or more narrow frequency bands have a higher intensity than the broadband ultrasonic guided waves.

In another embodiment, a system of selecting operating parameters for inspecting a structure includes an ultrasonic transmitter, an ultrasonic receiver, and a controller. The ultrasonic transmitter is configured to excite broadband ultrasonic guided waves in a multilayered structure. The ultrasonic receiver is configured to sense the broadband ultrasonic guided waves in the multilayered structure and to generate data corresponding to the sensed broadband ultrasonic guided waves in the multilayered structure. The controller is configured to select, based on the acquired data, a narrow frequency bandwidth of ultrasonic guided waves for use in a subsequent inspection of the multilayered structure.

In one example, the multilayered structure includes a coated structure. In another example, the ultrasonic transmitter is configured to excite the broadband ultrasonic guided waves in one of a plurality of layers of the multilayered structure, and the ultrasonic receiver is configured to sense the broadband ultrasonic guided waves in the at least one of the plurality of layers. In another example, the ultrasonic receiver is configured to traverse the structure while sensing the broadband ultrasonic guided waves in the coated structure. In another example, the ultrasonic receiver includes a guided wave phased transducer array installed on the coated structure. In another example, the guided wave phased transducer array includes one or more additional receivers configured to sense the broadband ultrasonic guided waves in a load carrying portion of the structure. In another example, the ultrasonic transmitter is an ultrasonic transceiver configured to receive ultrasonic signals. In another example, the ultrasonic transmitter is configured to traverse the structure while transmitting the broadband ultrasonic guided waves in the multilayered structure. In another example, the ultrasonic transmitter and the ultrasonic receiver have physical access only to the outermost layer of the multilayered structure and a broadband signal method is used to find an optimal and physically verifiable operating point.

In another embodiment, a computer readable storage medium has embodied thereon instructions for selecting operating parameters for inspecting a structure. The instructions, in response to execution by a computing device, cause the computing device to excite broadband ultrasonic guided waves in a multilayered structure, acquire, from an inspection tool capable of sensing the broadband ultrasonic guided waves in the multilayered structure, data corresponding to the sensed broadband ultrasonic guided waves in the multilayered structure, select one or more narrow frequency bands based on the acquired data, and inspect the multilayered structure using ultrasonic guided waves in the one or more narrow frequency bands.

In one example, the multilayered structure comprises a coated metallic pipe having one or more of a varying wall thickness, a varying coating thickness, or a varying quality. In another example, the inspection tool is an electromagnetic acoustic transducer based inline inspection tool. In another example, the one or more narrow frequency bands comprise a long pulse width with a plurality of cycles. In another example, the ultrasonic guided waves in the one or more narrow frequency bands have a higher intensity than the broadband ultrasonic guided waves.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 depicts an embodiment of an EMAT transmitter and an EMAT receiver placed on the bare side of a steel plate with a coating located on the side of the steel plate opposite the EMAT transmitter and the EMAT receiver; and FIG. 5 depicts an example of a method of selecting operating parameters for inspecting a structure, in accordance with the embodiments described herein.

DETAILED DESCRIPTION

Figure 1A:
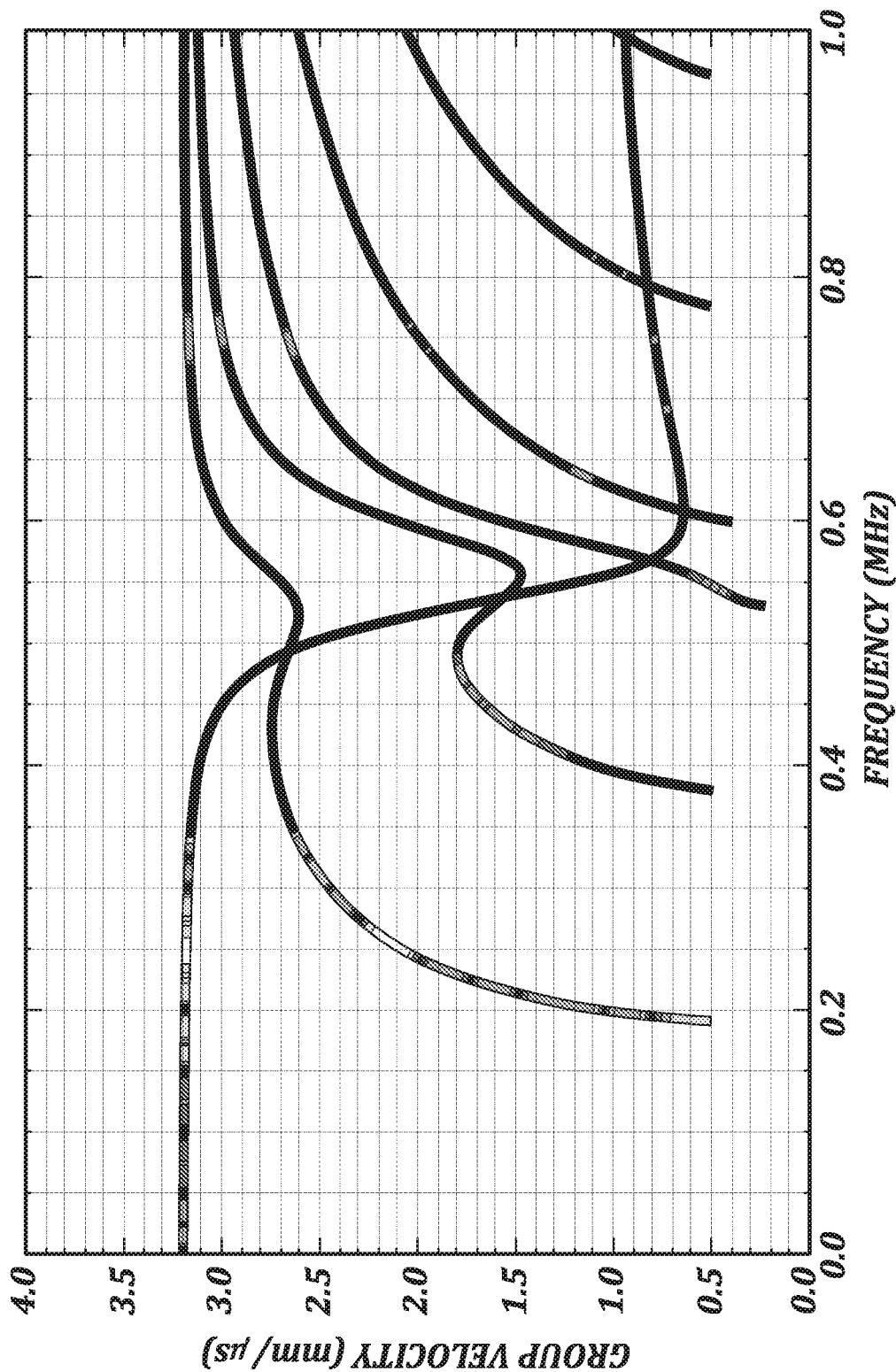
FIGS. 1A and 1B depict shading-coded dispersion curves for shear horizontal guided waves in a plate for different coating thicknesses.

In practice, structures of a given type and make often vary in properties (e.g., thickness and quality) within the same specimen (e.g., a structural unit) and from specimen to specimen. In such a scenario, an operating point selected for one set of specimen structural properties may not be an optimal point for another specimen or region of inspection, rendering the effort invested in modeling and development ineffective. Therefore, devices and methods that enable an automated selection of operating points are desirable. Further, in the case of inspection devices that travel across structures (e.g., inline inspection tools), it is desirable for the automatic selection of operating points to occur quickly so that the operating points of the inspection system may be changed between multiple inspection attempts.

In principle, the variations in properties of any layer in a multilayered structure may be considered as flaws. However, there are several applications where one or more of the layers of a multilayered structure have functions other than supporting or carrying the load. Even if variation in the properties of such layers does occur, the structure may still be considered to be healthy despite the variation in the properties, provided that flaws do not exist in the load carrying layers. In other words, flaws that exist in the load carrying structure are critical as they adversely affect the structure's performance and health. However, the interaction of the guided wave with the non-load carrying layer may adversely impact the inspection device's sensitivity to flaws present in the load-carrying layers. A dynamic or automatic operating point selection method can serve the purpose of ignoring the non-critical layer variations if the critical load carrying layer is accessible.

Most transducer designs in literature are based on theory for guided wave propagation in plates due to a lack of reliable theoretical formulation on circumferential guided waves in pipes. Theory on circumferential guided waves in pipes shows that the transducer parameters need to change with the change in both pipe diameter as well as pipe thickness. These factors further highlight the potential benefits of an automated operating point selection method as discussed earlier.

The subject matter disclosed herein includes an embodiment of a method for dynamically selecting the operating parameters by periodically exciting ultrasonic guided waves in a single or multilayered structure, such as a pipe, a plate, or other structure. In one embodiment, the ultrasonic guided waves have a broad frequency bandwidth. In another embodiment, the ultrasonic guided waves have a narrow pulse width. The method also includes acquiring the data or signals corresponding to the guided waves actually generated in the structure and processing the data acquired using an inspection tool, such as an electromagnetic acoustic transducer (EMAT) based inline inspection (ILI) tool. In one embodiment, the structure includes a pipeline with varying wall or coating thicknesses and the data or signals are acquired while the ILI tool is operational and is traversing across the length of the pipeline being inspected. In some embodiments, the method also includes selecting operating parameters based on the acquired data or signals where the operating parameters are then used in the subsequent inspection cycles for narrow frequency bandwidth (or long pulse width with multiple cycles) guided wave generation for high resolution and high fidelity inspection of pipelines.

When applied to other kinds of transduction and inspection methodologies, such as long-range ultrasonic guided wave inspection systems that operate from a fixed location, devices and methods for automatic selection of operating points disclosed herein can be electronically controlled, such as by controlling one or more of frequency range, time delay distribution, amplitude distribution, or any combination thereof. In some embodiments, the devices and methods disclosed herein are employed as a means for evaluating the structural properties (e.g., averaged along the direction of wave propagation), such as thickness, modulus of elasticity, viscosity and mass density, in each layer included in the structure.

The broadband frequency excitation of guided waves can be performed once or on a periodic basis while the inspection device is still operational in a given unit of a structure. In some embodiments, the temporal (time) dimensions of the signal used for the broadband frequency excitation is narrow (e.g., half a cycle of alternating current/voltage in time). Broadband excitation has been used in the past to perform full material characterization using high power laser-actuated ultrasound. Embodiments of devices described herein are adapted to a different scenario, namely a coated and multilayered structure to choose an operating point rather than to characterize material properties. However, characterization of material properties can be performed in addition to choosing an operating point for the transduction. In effect, the approach described herein, characterizes both the substrate properties and the transducer properties to arrive at one or more optimal operating points. The selected operating point(s) is (are) then used with narrow band frequency (e.g., multicycle alternating current/voltage in time using the newly selected operating parameters) to induce acoustic energy of higher intensity into the structure and thereby achieve or maintain high sensitivity to flaws despite any changes in the properties.

In one example disclosed herein, a structure includes epoxy-coated steel plates using the so called shear horizontal (SH) guided waves and loss mechanisms that manifest themselves due to a change in thickness of the coating, which demonstrate why the optimum operating points for one case does not remain the optimum operating point for another. This example also demonstrates a configuration where a layer (i.e., the coating) does not play the role of a load carrying member, a scenario that was discussed earlier. Subsequently, the concept of broadband frequency excitation is introduced as a means to overcome the difficulties posed by the loss mechanisms. Although the example includes a coated plate, the principles explained herein are directly applicable to coated pipes.

Loss Mechanisms Due to Coating Thickness Variation

Figure 1B:
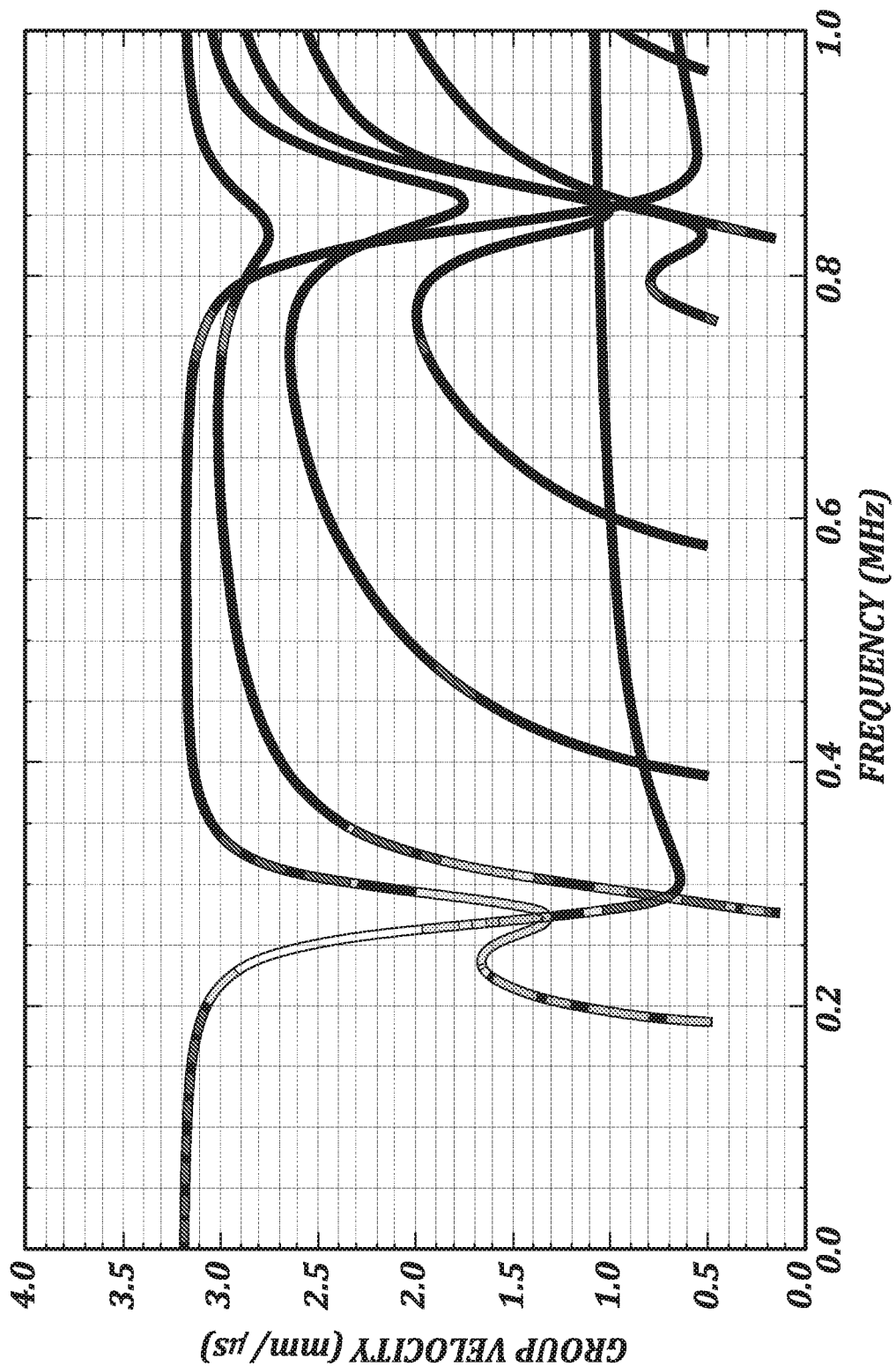

Depicted in FIGS. 1A and 1B are shading-coded dispersion curves for SH guided waves in a plate of 9.5 mm thickness for different coating thicknesses. More specifically, the shading-coded dispersion curves FIGS. 1A and 1B depict dispersion curves for SH guided waves in a plate of 9.5 mm thickness with coatings of 0.5 mm and 1 mm, respectively. The shading variation on the dispersion curves corresponds to the relative strength by which a mode might be excited due to a given set of EMAT parameters, with black=−60 dB, white=0 dB. In this particular example, the following set of EMAT parameters were used: operating frequency=0.25 MHz, EMAT pitch or periodicity=0.25 inches, and number of EMAT elements (or coil turns)=5. Dispersiveness of a guided wave mode (or a finite segment of the dispersion curves relative to finite frequency range) denotes the degree of variation in the velocities that are characteristic to the mode. In general, guided waves corresponding to a highly dispersive mode also tend to dissipate faster. Clearly, in the case of the coating thickness of 0.5 mm depicted in FIG. 1A, the contributing guided waves modes are relatively non-dispersive when compared to the contributing modes for the coating thickness of 1 mm depicted in FIG. 1B. This demonstrates one mechanism of loss due to change in dispersiveness of the guided wave modes with coating thickness.

Figure 2A:
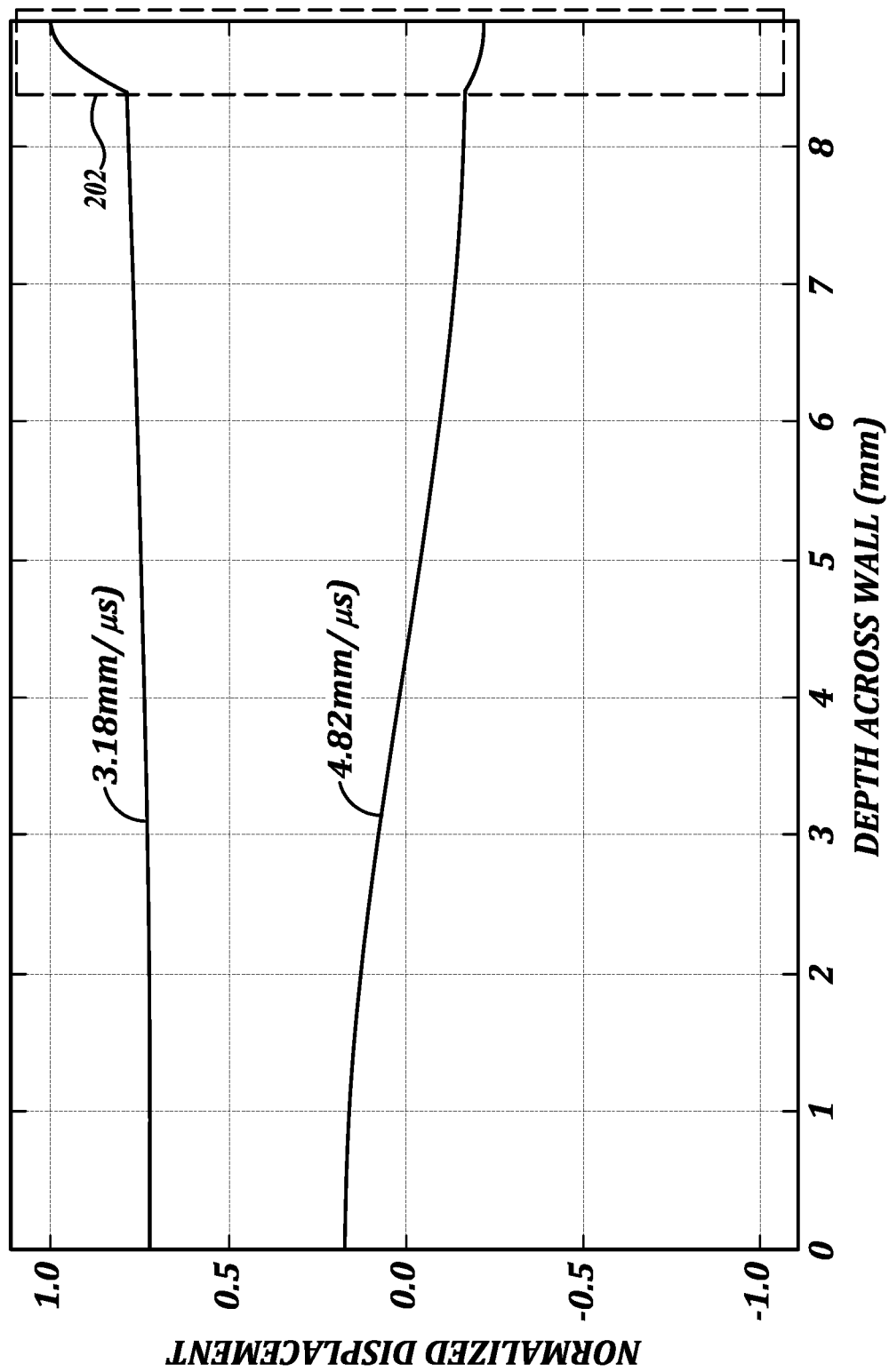
FIGS. 2A and 2B demonstrate normalized particle displacements for the shear horizontal guided waves in a plate for different coating thicknesses corresponding to FIGS. 1A and 1B, respectively.
Figure 2B:
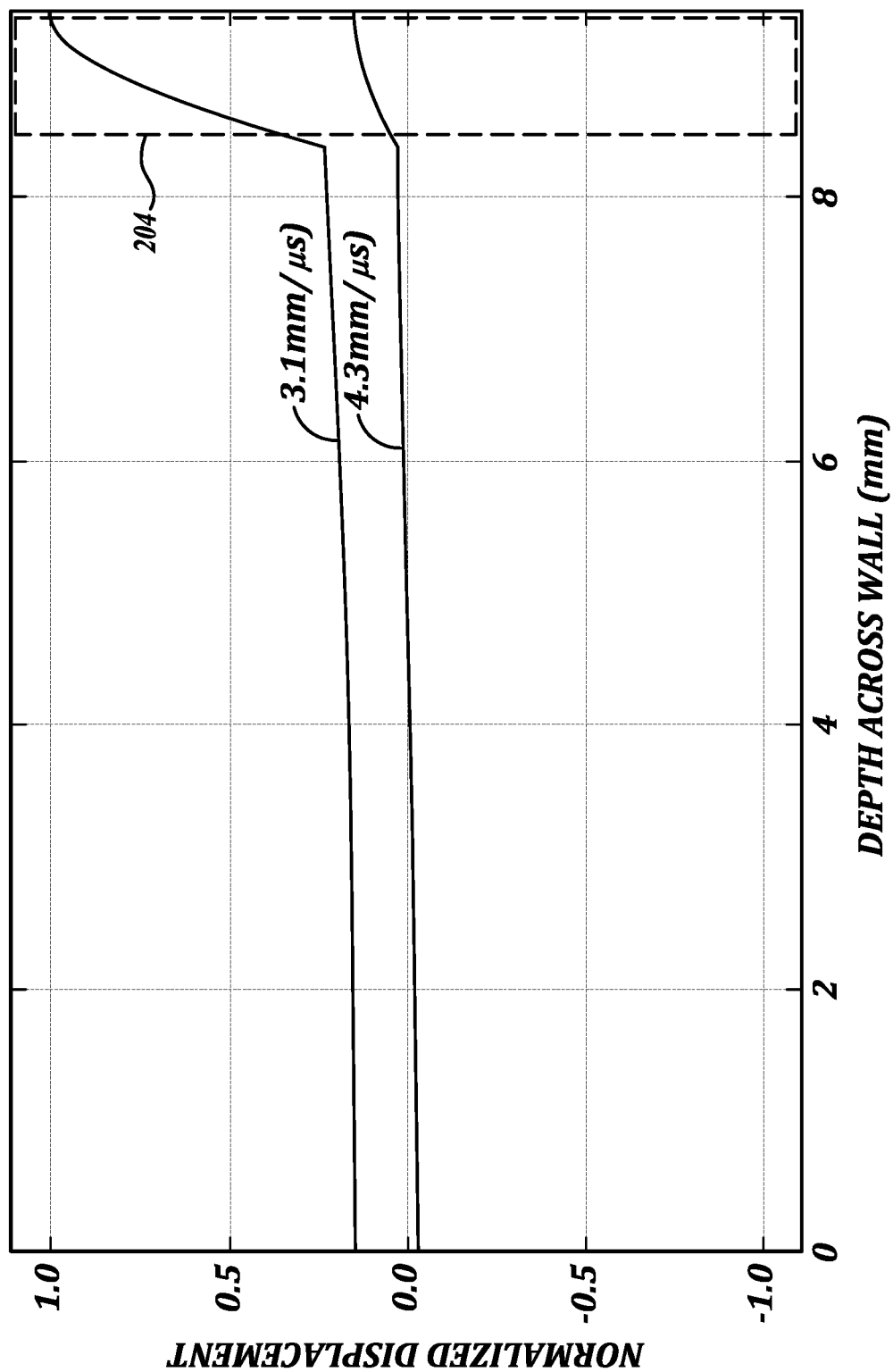

Another mechanism of loss is apparent when considering the manner in which the strength of the wave is distributed between the steel plate and the coating. FIGS. 2A and 2B demonstrate normalized particle displacements for the cases corresponding to FIGS. 1A and 1B, respectively (i.e., for 0.5 mm and 1 mm coating thicknesses, respectively, and an operating point corresponding to 0.25 MHz). In some embodiments, normalized particle displacements are indicators of the strength of the wave. The regions in the dashed boxes 202 and 204 represent epoxy and the regions outside of the boxes 202 and 204 represent steel. The displacement distribution curves are scaled based on the spectral amplitude of each mode. The phase velocity for each mode is displayed in the legend.

As shown in FIG. 2A, where the coating thickness is 0.5 mm, the strength of the contributing modes in steel (outside of box 202) is comparable to that in epoxy (within the boxed region). In contrast, as shown in FIG. 2B, the strength of the contributing modes (outside of box 204) is much higher in epoxy when compared to steel. This means that a major part of the acoustic energy, irrespective of the transduction method, will propagate through the epoxy, when a mismatched operating point is used. Since, in some embodiments, the EMAT senses the acoustic energy exclusively based on the steel surface and most of the energy is trapped in the coating, relatively lower transduction efficiency will be observed.

Viscous loss is another mechanism which is capable of affecting the strength of the signal and, in addition, varies depending on the thickness of the coating. Viscosity is the material property which determines its resistance to the rate of change of deformation. In some cases, viscous loss is predominant in regions where the dips in the group velocity dispersion curves occur. In addition to variation of coating thicknesses, variation in elastic moduli and density may also cause a similar distortion of the dispersion curves with similar effects on the sensitivity of the inspection device to flaw size.

In some embodiments, to overcome the problem of accidentally encountering a mismatched point, the tool dynamically changes the operating point as the inspection tool moves axially through the pipe. The dynamic change of operating point may be achieved simply by periodically using a broadband frequency excitation and analyzing the frequency spectrum. The frequency range over which the relative amplitudes are greater may be used in a subsequent inspection.

Figure 3:
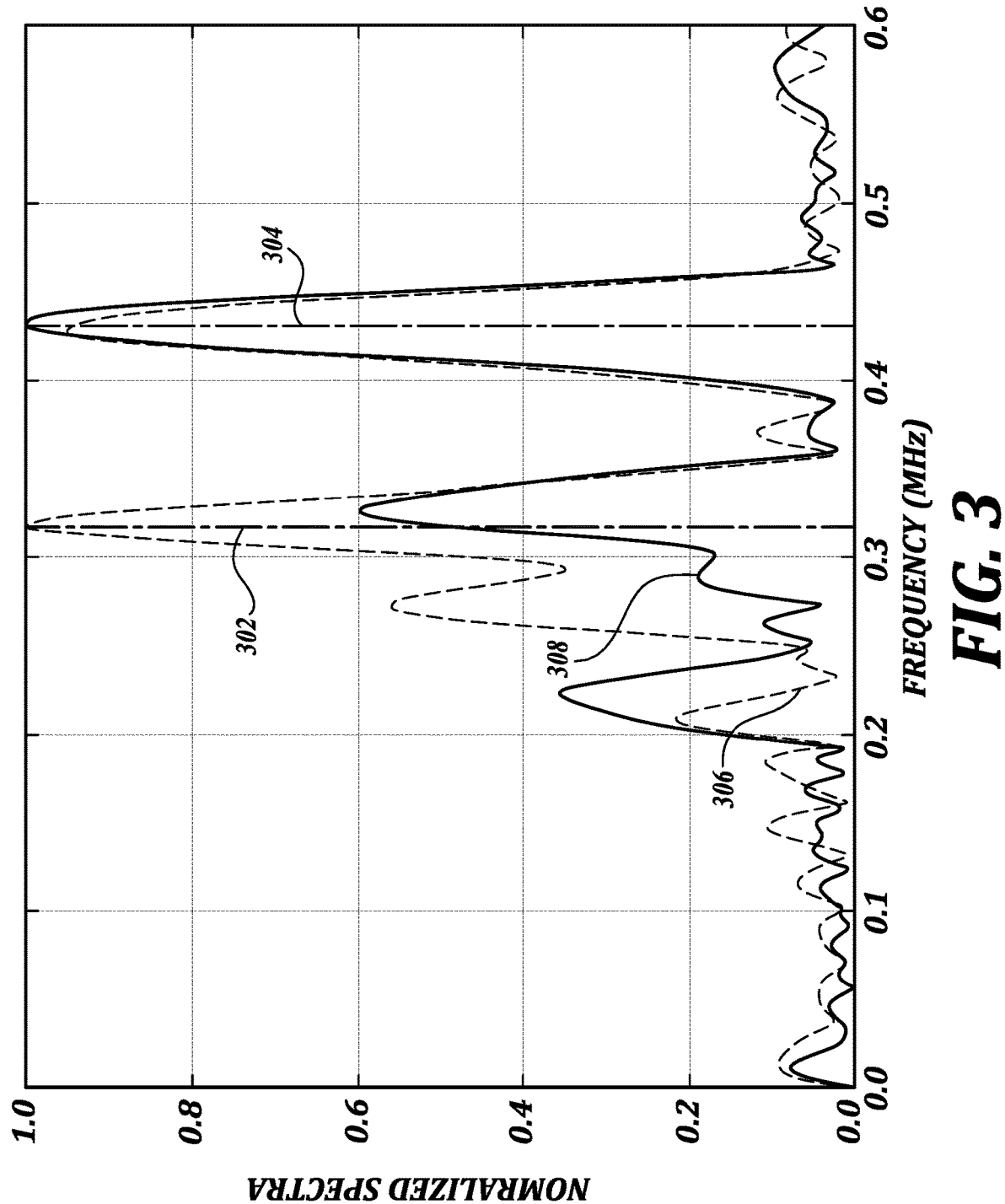
FIG. 3 depicts an example of frequency domain spectrum of guided wave signals resulting from broadband excitation at two locations on a coated steel plate sample with coating variations.

An example is illustrated in FIG. 3, which shows the frequency domain spectrum of the guided wave signals resulting from broadband excitation at two locations on a coated steel plate sample with coating variations. The data in FIG. 3 was obtained using the arrangement 400 depicted in FIG. 4. As shown in FIG. 4, an EMAT transmitter 402 and an EMAT receiver 404 were placed on the bare side of a steel plate 406. A coating 408 was located on the side of the steel plate 406 opposite the EMAT transmitter 402 and the EMAT receiver 404.

In some embodiments, optimum operating frequencies are determined using frequency domain spectrum of the guided wave signals. In the embodiment shown in FIG. 3, optimum operating frequencies 302 and 304 are determined at roughly 0.325 MHz and 0.425 MHz. In this embodiment, the optimum operating frequencies 302 and 304 are determined where the maximum spectral values occur, for the cases represented by the solid and dashed lines, respectively. In practical situations, the operating point could be updated less frequently when compared to each inspection cycle by the inspection tool. Some form of spatial averaging could be used during the processing of the received signals. The update rate may vary depending on the specific application based on pipe diameter, speed and other parameters.

A useful byproduct of the broadband frequency approach is that it provides an average measure of coating and pipe wall characteristics (e.g., averaged along the wave propagation direction). For example, referring to FIG. 3, wherein, the frequency spectrum due to a broadband excitation for two different coating thicknesses on the plate is depicted. The spectra of both of these cases encounter dips in amplitude 306 and 308 within a frequency range of 0.2 to 0.3 MHz. Comparing with the frequency ranges at which the troughs in the group velocity curves occur in FIG. 1B, and the unexpected dips 306 and 308 (unexpected troughs) in FIG. 3, it may be inferred that the coating thickness for both the cases is around 1 mm. The specific frequencies where the unexpected dips 306 and 308 occur will give a more accurate estimate of the coating quality, and the relative separation (in frequency) between the peaks (marked as optimal operating points 302 and 304 in FIG. 3) will provide an estimate of steel wall thickness. In some embodiments, additional optimal points exist above 0.5 MHz. However, in the particular these have been suppressed due to the characteristics of receiver electronics for this particular lab setup. In some cases, additional optimal points will improve accuracy of substrate characterization.

One example of a method 500 of selecting operating parameters for inspecting a structure is depicted in FIG. 5. At block 502, broadband ultrasonic guided waves are excited in a multilayered structure. In some embodiments, the multilayered structure includes a coated metallic pipe having one or more of a varying wall thickness, a varying coating thickness, or a varying quality. At block 504, an inspection tool capable of sensing the broadband ultrasonic guided waves in the multilayered structure is used to acquire data corresponding to the sensed broadband ultrasonic guided waves in the multilayered structure. In some embodiments, the inspection tool is an inline inspection tool, such as an electromagnetic acoustic transducer based inline inspection.

At block 506, the one or more narrow frequency bands are selected based on the acquired data. In some embodiments, the one or more narrow frequency bands include a long pulse width with a plurality of cycles. In some embodiments, the ultrasonic guided waves in the one or more narrow frequency bands have a higher intensity than the broadband ultrasonic guided waves. At block 508, the multilayered structure is inspected using ultrasonic guided waves in the one or more narrow frequency bands.

The method 500 depicted in FIG. 5 is one embodiment of a method of selecting operating parameters for inspecting a structure. In other embodiments, method of selecting operating parameters for inspecting a structure include additional step or fewer steps than those depicted in FIG. 5. In other embodiments, the steps of such methods are performed in an order different than the order depicted in FIG. 5.

In some embodiments, instructions for performing the method 500 or any other method described herein are embodied on non-transitory computer-readable storage medium. Those instructions, when executed by a system, cause the system to perform the steps of the corresponding method. In some embodiments, the system includes a computing device with one or more processors communicatively coupled to the storage medium and configured to execute the instructions stored on the storage medium. As used herein, the term "computer-readable storage medium" includes volatile and nonvolatile and removable and non-removable media implemented in any method or technology capable of storing information, such as computer-readable instructions, data structures, program modules, or other data. In some examples, technology capable of storing information includes, but is not limited to, a hard drive, solid state drive, CD ROM, DVD, or other disk storage, magnetic tape, magnetic disk storage, and/or the like.

Loss Mechanisms Due to Coating Thickness Variation

The embodiments of devices, systems and methods described herein may be adapted to inspection of multilayered structures using tools and paradigms other than inline inspection tools.

The examples presented herein include scenarios where the load carrying layer in a multilayered structure is either physically or electromagnetically accessible (as defined below) for sensing or generating guided waves. A workaround for the case when neither physical nor electromagnetic access is feasible is also discussed. Physical access to a load-carrying layer is when the ultrasonic sensor is directly touching the load carrying layer. For example, fixed inspection devices often necessitate machining the region directly below the sensor in order to touch the load carrying layer; whereas, in the case of an in-line pipe inspection device, the tool directly contacts the load carrying layer from the inside. A non-trivial example of electromagnetic access is represented by the scenario where an EMAT is on the coated side of a polymer-coated metallic plate. Since the EMAT senses vibrations or guided waves propagating only in the metallic part of a structure, machining the coating is not necessary for particular coating thicknesses.

Another non-trivial example of electromagnetic access is the scenario wherein an optical device, such as a laser vibrometer or interferometer, is used as an ultrasonic receiver while all the layers of a multilayered structure, other than the load carrying layer, are transparent with respect to the laser's characteristic range of wavelengths. Other ideal conditions where this method would be a practical option include when the load carrying layer has good optical reflectivity and the optical aberrations due to the transparent layers are not severe.

In general, the ultrasonic transmitter does not need to have direct access to the load carrying layer if the waves can be generated in the non-load-carrying layers using a given transmitter. For example, in the case of a guided wave phased array transducer, the phased array may be installed on the coated structure (e.g., coated pipe) without removal of the coating layer. This is an advantage offered by the embodiments disclosed herein, where not all the receivers may be directly in contact with the load carrying layer. The advantage includes not requiring the full removal of the coating layer during installation of the transducer array, in contrast to the mandatory practice of removing the coating layer in conventional methods of installation. This is desirable, in particular, when the full circumference of the pipeline is not accessible.

In some embodiments, such as where neither physical nor electromagnetic means of access to the load-carrying layer is feasible, a modified approach may be adopted. Examples of such scenarios include: scenarios when modification of the substrate (e.g., removing a portion of the coating on a pipe) is not feasible; scenarios where the transducers are mounted on top of the coating; and/or scenarios where it is not feasible to electromagnetically access the load-carrying layer (e.g., very thick non-load-carrying layers). In some of these scenarios, all sensors, including the receivers, are mounted on top of the outermost layer without any modification of the substrate. The modified approach in such scenarios includes exciting the waves with the operating point where the wave is fastest and the signal strength is just above the noise threshold. In this case, it is expected that the wave velocity is fastest in the load-carrying layer in the absence of adjoining material. Typically, load-carrying layers tend to have faster wave velocities than non-load-carrying layers. In the very unlikely case, where the load-carrying layer or the layer of critical functionality has faster wave propagation in the absence of any adjoining material or media, the operating point corresponding to the slower wave may be chosen. As used in these examples, the velocity refers to the bulk velocity of ultrasound.

In other embodiments, multiple receivers may be used and the signals received in such a manner may be analyzed using multi-dimensional Fourier transform. This kind of data acquisition and analysis may be used in the scenario where the transduction system is capable of exciting modes corresponding to an arbitrary range of frequency and velocity values. Examples of such transducer systems are magnetostrictive EMATs with multiple coils of different characteristic wavelengths and phased array transducers.

Alternatively, though possibly more complex, methods of exciting guided waves may also be employed for selecting the operating point. One example of this is a series of narrow frequency band (or long pulse width), each with a perturbed but distinct median frequency. The broadband frequency excitation will be a suitable option in many cases, but the multiple narrowband frequency series may be resorted to exploit certain conditions, such as low tool travel speeds, or to account for cases where higher power provides greater resolution for the guided waves to propagate.

In some embodiments, a frequency sweep or a chirp signal that causes a continuous variation of frequency with time is another example of an excitation signal that may be used for selecting the operating point. In some examples, this method is desirable when the inspection tool travel speeds are high and the thickness variations are not very drastic. The chirp signal may also be used in highly-attenuative conditions, such as in fiber reinforced polymer composite (FRPC) wrapped metal pipe structures, or in cases where the distance between the transmitting and receiving transducers is large.

The methods described herein may also be employed in the inspection of FRPC components with or without a metal substrate. In some embodiments, the transducers employed in the inspection of FRPC components are piezoelectric. In some embodiments, the transducers are embedded into the FRPC structure.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method of selecting and optimizing operating frequencies for inspecting a multilayered structure that comprises metal, the method using guided waves, the method comprising:
    traversing an inspection tool across the multilayered structure, wherein the inspection tool is an inline inspection (ILI) tool in contact with the multilayered structure;
    exciting, by an electromagnetic acoustic transducer (EMAT) ultrasonic transmitter of the inline inspection (ILI) tool, broadband ultrasonic guided waves in the multilayered structure that comprises a load carrying metal layer and a non-load carrying coating, wherein the guided waves travel along peripheral surfaces of the multilayered structure, and wherein the guided waves are bounded by the peripheral surfaces of the multilayered structure;
    acquiring the broadband ultrasonic guided waves by an ultrasonic EMAT receiver of the inline inspection (ILI) tool, wherein the ultrasonic EMAT receiver is configured for sensing the broadband ultrasonic guided waves that travel along the peripheral surfaces of the multilayered structure, wherein the ultrasonic EMAT receiver is longitudinally or circumferentially offset from the ultrasonic EMAT transmitter, and wherein acquired data corresponds to the sensed broadband ultrasonic guided waves in the multilayered structure;
    selecting one or more narrow spectral bands within the acquired data;
    dynamically changing the operating frequencies of the ultrasonic EMAT transmitter based on the acquired data, wherein the guided waves are generated at optimal operating frequencies that are spectral peaks within the selected one or more narrow spectral bands of the acquired data; and
    inspecting the multilayered structure using ultrasonic guided waves that propagate at one or more said optimal frequencies along the peripheral surfaces of the multilayered structure from the ultrasonic EMAT transmitter to the ultrasonic EMAT receiver.

2. The method of claim 1, wherein the multilayered structure comprises a coated metallic pipe having one or more of a varying wall thickness, a varying coating thickness, or a varying quality.

3. The method of claim 1, wherein the one or more narrow spectral bands comprise a long pulse width with a plurality of cycles.

4. The method of claim 1, wherein the ultrasonic guided waves in the one or more narrow spectral bands have a higher intensity than the broadband ultrasonic guided waves.

5. A computer-readable storage medium having embodied thereon instructions for selecting operating frequencies for inspecting a multilayered structure that comprises metal, wherein the instructions, in response to execution by a computing device, cause the computing device to:
    excite, by an electromagnetic acoustic transducer (EMAT) ultrasonic transmitter of an inline inspection (ILI) tool in contact with the multilayered structure, broadband ultrasonic guided waves in a multilayered structure that comprises a load carrying metal layer and a non-load carrying coating, wherein the guided waves travel along peripheral surfaces of the multilayered structure, and wherein the guided waves are bounded by the peripheral surfaces of the multilayered structure;
    acquire, by an electromagnetic acoustic transducer (EMAT) ultrasonic receiver of the inline inspection (ILI) tool, data corresponding to the broadband ultrasonic guided waves travelling along the peripheral surfaces in the multilayered structure, wherein the ultrasonic EMAT receiver is longitudinally or circumferentially offset from the ultrasonic EMAT transmitter;
    select one or more narrow spectral bands in acquired data;
    dynamically change the operating frequencies for the guided waves emitted by the ultrasonic EMAT transmitter to optimal operating frequencies that are spectral peaks within the one or more narrow spectral bands in the acquired data; and
    inspect the multilayered structure using ultrasonic guided waves that propagate at said optimal operating frequencies along the peripheral surfaces of the multilayered structure from the ultrasonic EMAT transmitter to the ultrasonic EMAT receiver.

6. The computer-readable storage medium of claim 5, wherein the multilayered structure comprises a coated metallic pipe having one or more of a varying wall thickness, a varying coating thickness, or a varying quality.

7. The computer-readable storage medium of claim 5, wherein the one or more narrow spectral bands comprise a long pulse width with a plurality of cycles.

8. The computer-readable storage medium of claim 5, wherein the ultrasonic guided waves in the one or more narrow spectral bands have a higher intensity than the broadband ultrasonic guided waves.

9. The method of claim 1, further comprising:
    determining a first average thickness of the load carrying metal layer based on a frequency separation between the narrow spectral bands in the sensed broadband ultrasonic guided waves; and
    determining a second average thickness of the non-load carrying coating based on a location of troughs in the sensed broadband ultrasonic waves.

* * * * *